US012783881B2

(12) United States Patent
Kim et al.

(10) Patent No.: US 12,783,881 B2
(45) Date of Patent: Nov. 3, 2026

(54) APPARATUS AND METHOD WITH OUT-OF-DISTRIBUTION DATA DETECTION

(71) Applicants: SAMSUNG ELECTRONICS CO., LTD., Suwon-si (KR); Seoul National University R&DB Foundation, Seoul (KR)

(72) Inventors: Jongseok Kim, Suwon-si (KR); Seungyong Moon, Seoul (KR); Hyun Oh Song, Seoul (KR)

(73) Assignees: Samsung Electronics Co., Ltd., Suwon-si (KR); Seoul National University R & DB Foundation, Seoul (KR)

( * ) Notice: Subject to any disclaimer, the term of this patent is extended or adjusted under 35 U.S.C. 154(b) by 624 days.

(21) Appl. No.: 18/360,229

(22) Filed: Jul. 27, 2023

(65) Prior Publication Data

US 2024/0242072 A1 Jul. 18, 2024

(30) Foreign Application Priority Data

Jan. 12, 2023 (KR) ........................ 10-2023-0004866

(51) Int. Cl.
*G06N 3/08* (2023.01)

(52) U.S. Cl.
CPC ..................................... *G06N 3/08* (2013.01)

(58) Field of Classification Search
CPC .......... G06N 3/08; G06N 3/045; G06N 3/084; G06N 3/0475; G06V 10/764; G06V 10/82
See application file for complete search history.

(56) References Cited

U.S. PATENT DOCUMENTS

2019/0303754 A1* 10/2019 Ranjan .................. G06N 3/084
2021/0216828 A1* 7/2021 Ramaiah ............... G06N 3/045
(Continued)

FOREIGN PATENT DOCUMENTS

KR 10-1645292 B1 8/2016
KR 10-2019-0098107 A 8/2019
(Continued)

OTHER PUBLICATIONS

Sun et al. ("Out-of-Distribution Detection with Deep Nearest Neighbors", Proceedings of the 39th International Conference on Machine Learning, PMLR 162:20827-20840, 2022.) (Year: 2022).*
(Continued)

*Primary Examiner* — Imad Kassim
(74) *Attorney, Agent, or Firm* — NSIP Law

(57) ABSTRACT

An apparatus and method with out-of-distribution data detection is provided. The apparatus includes one or more processors configured to execute instructions; and one or more memories storing the instructions, wherein, the execution of the instructions by the one or more processors configures the one or more processors to generate output data using a neural network model provided input data; determine, based on the output data, a maximum loss value among calculated loss values that correspond to neighboring data within a reference distance from the input data; and detect, based on the maximum loss value and a threshold, whether the input data is out-of-distribution (OOD) data that is different from in-distribution data corresponding to training data used in a training of the neural network model.

20 Claims, 5 Drawing Sheets

(56) References Cited

U.S. PATENT DOCUMENTS

| | | | | |
|---|---|---|---|---|
| 2021/0365771 | A1 | 11/2021 | Speakman | |
| 2022/0318602 | A1* | 10/2022 | Saha | G06N 3/08 |
| 2023/0044102 | A1* | 2/2023 | Anderson | G06N 20/20 |

FOREIGN PATENT DOCUMENTS

| | | | |
|---|---|---|---|
| KR | 10-2265361 | B1 | 6/2021 |
| KR | 10-2021-0085373 | A | 7/2021 |
| KR | 10-2021-0123674 | A | 10/2021 |

OTHER PUBLICATIONS

Goodfellow et al. ("Explaining and Harnessing Adversarial Examples", Mar. 20, 2015, google inc.) (Year: 2015).*

Hendrycks et al. "Deep Anomaly Detection With Outlier Exposure" arXiv preprint arXiv:1812.04606, Jan. 28, 2019 (pp. 1-18).

* cited by examiner

APPARATUS AND METHOD WITH OUT-OF-DISTRIBUTION DATA DETECTION

CROSS-REFERENCE TO RELATED APPLICATIONS

This application claims the benefit under 35 USC § 119(a) of Korean Patent Application No. 10-2023-0004866, filed on Jan. 12, 2023, in the Korean Intellectual Property Office, the entire disclosure of which is incorporated herein by reference for all purposes.

BACKGROUND

1. Field

The following description relates to an apparatus and method with out-of-distribution data detection.

2. Description of Related Art

Detection of out-of-distribution (OOD) data may be classified into a type of anomaly data detection. Typically, an out-of-distribution (OOD) sample is detected using a logic vector for an input sample or using a large volume of reference samples by adding random noise to input samples.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a computing apparatus includes one or more processors configured to execute instructions; and one or more memories storing the instructions, wherein, the execution of the instructions by the one or more processors configures the one or more processors to generate output data using a neural network model provided input data; determine, based on the output data, a maximum loss value among calculated loss values that correspond to neighboring data within a reference distance from the input data; and detect, based on the maximum loss value and a threshold, whether the input data is out-of-distribution (OOD) data that is different from in-distribution data corresponding to training data used in a training of the neural network model.

For the determining of the maximum loss, the one or more processors may be further configured to determine the maximum loss value among the loss values using a cross entropy loss function.

For the detection, the one or more processors may be further configured to, when the maximum loss value is greater than or equal to the threshold, determine the input data to be the OOD data.

For the detection, the one or more processors may be further configured to, when the maximum loss value is less than the threshold, determine the input data to be the in-distribution data.

The input data comprises an image, the neural network model may include an image classification model, and the in-distribution data corresponds to plural image data of each of plural classes the image classification model was trained to classify.

For the determining of the maximum loss, the one or more processors may be further configured to generate converted data by adding noise to the input data; and determine, based on the output data, the maximum loss value among loss values corresponding to neighboring data within a reference distance from the converted data.

For the determining of the maximum loss, the one or more processors may be further configured to determine a gradient value by differentiating a loss function, used to calculate the loss values, with respect to the converted data; generate, based on the gradient value and the converted data, updated converted data using gradient descent; and determine, based on the output data and the loss function, the maximum loss value among loss values corresponding to neighboring data within a reference distance from the updated converted data.

In another general aspect, a processor-implemented method includes generating output data using a neural network model provided input data; determining, based on the output data, a maximum loss value among calculated loss values that correspond to neighboring data within a reference distance from the input data; and detecting, based on the maximum loss value and a threshold, whether the input data is out-of-distribution (OOD) data that is different from in-distribution data corresponding to training data used in a training of the neural network model.

The determining of the maximum loss value may include determining the maximum loss value among the loss values using a cross entropy loss function.

The detecting of whether the input data is the OOD data may include, when the maximum loss value is greater than or equal to the threshold, detecting the input data to be the OOD data.

The detecting of whether the input data is the OOD data may include, when the maximum loss value is less than the threshold, detecting the input data to be the in-distribution data.

The input data may include an image, the neural network model comprises an image classification model, and the in-distribution data corresponds to plural image data of each of plural classes the image classification model has trained to classify.

The method may further include generating converted data by adding noise to the input data; and determining, based on the output data, the maximum loss value among loss values corresponding to neighboring data within a reference distance from the converted data.

The method may further include determining a gradient value by differentiating a loss function, used to calculate the loss values, with respect to the converted data; generating, based on the gradient value and the converted data, updated converted data using gradient descent; and determining, based on the output data and the loss function, the maximum loss value among loss values corresponding to neighboring data within a reference distance from the updated converted data.

A non-transitory computer-readable storage medium storing instructions that, when executed by one or more processors, may cause the one or more processors to perform the method described above.

In another general aspect, a computing apparatus includes one or more processors configured to execute instructions; and one or more memories storing the instructions, wherein, the execution of the instructions by the one or more processors configures the one or more processors to generate respective output values obtained from the neural network model provided the input data and provided neighboring data; generate, based on the generated respective output values and a loss function, a flatness value within a reference distance from the input data, and detect, based on the flatness and a threshold, whether the input data is out-of-distribution (OOD) data.

The neighboring data may be generated by adding noise to the input data.

The one or more processors may be further configured to determine the input data is forged or altered biometric data based on the input data being detected to be the OOD data.

The one or more processors may be further configured to determine, based on the flatness value, whether the input data is forged or altered biometric data.

The flatness value may correspond to a maximum loss value among loss values generated using the loss function and the respective output values.

Other features and aspects will be apparent from the following detailed description, the drawings, and the claims.

Figure 1:
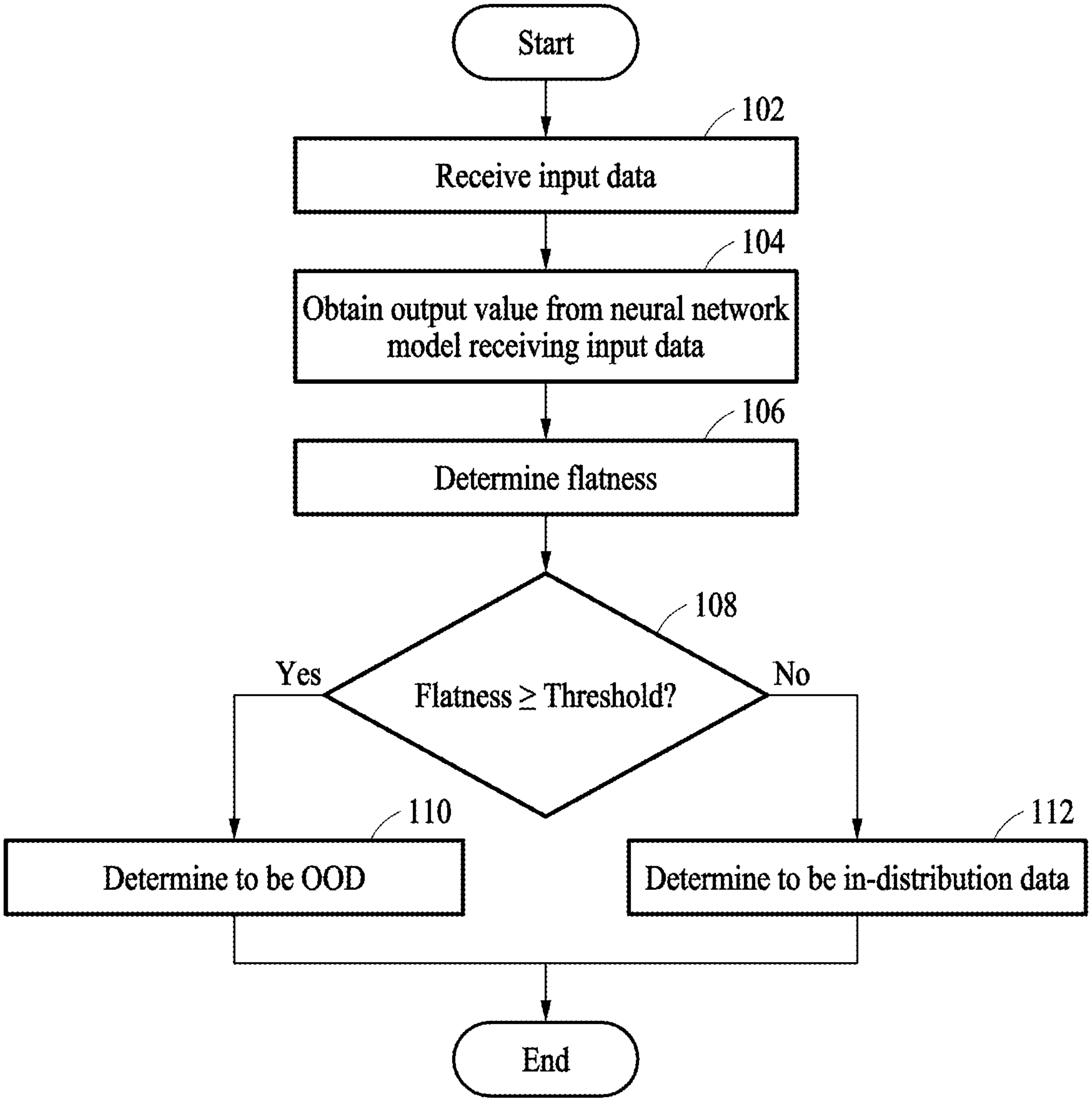
FIG. 1 illustrates an example method with out-of-distribution (OOD) data detection according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Detection of OOD data, for example, input data that is unrelated to the task or training data the neural network was trained on may cause an increase in a classification error rate and may consume considerable time and computing resources.

FIG. 1 illustrates an example method with out-of-distribution (OOD) data detection according to one or more embodiments.

Referring to FIG. 1, the example method may include operations 102 through 112, which may be performed as illustrated by a flowchart in the shown order and manner. However, the order of some operations may be changed, or some operations may be omitted, without departing from the spirit and scope of the shown example method. Some of the operations shown in FIG. 1 may be performed in parallel, concurrently, or any suitable order that may optimize the method described with reference to FIG. 1.

In-distribution data may be data having the same or similar characteristics to data used for training a neural network. OOD data may be data having a different characteristic from in-distribution data. For example, when an image of an animal (for example, a dog, a cat, and the like) is used for training a neural network classifying an image of an animal, the image of the animal may be in-distribution data, but an image of a non-animal object such as a vehicle or an airplane, which may not be accurately classifiable by the neural network due to a different characteristic from an animal, may thus be determined as OOD data.

When a typical neural network model receives OOD data that is not alike the training data, the neural network model may mistakenly recognize the OOD data as in-distribution data and thus output an output value. As a result, the reliability of the neural network model may be degraded and various industrial fields to which the neural network model is applied may be significantly disturbed. Accordingly, one or more embodiments may provide an alternate method and apparatus described below aims to provide approach to more accurately and effectively detect OOD data and improve the reliability of the neural network model.

The example method including operations 102 through 112 may be performed by a computing apparatus as a non-limiting example. The computing apparatus may include one or more processors configured to execute instructions, and one or more memories storing the instructions. The execution of the instructions by the one or more processors may configure the computing apparatus to perform any one or any combination of these or any other operations or methods described herein. As a non-limiting example, the computing apparatus may be configured to detect whether input data is OOD data or in-distribution data based on a flatness of the input data. The computing apparatus may be configured to determine the flatness by identifying/determining a maximum value among loss values respectively corresponding to pieces of neighboring data around the input data, and may detect, based on the determined flatness and a predetermined threshold, whether the input data is OOD data. An example description of an example method using such a computing apparatus to detect OOD data is provided below with reference to the flowchart of FIG. 1.

In operation 102, the computing apparatus may receive input data. When input data may be an image of a target object, the input data may include a vector in an Euclidean space including a width value, a height value, and an RGB channel value. The image may be captured by a sensor (e.g., a camera), which may be an interior or exterior of the computing apparatus.

In operation 104, the computing apparatus may generate/obtain an output value from a machine learning model receiving the input data. The machine learning model may be a neural network, as a non-limiting example, configured to classify an image, and the type of the neural network model is not limited thereto. The neural network model may include a deep neural network model. The neural network model may include a convolutional neural network (CNN), a recurrent neural network (RNN), a perceptron, and a multilayer perceptron, as non-limiting examples.

The neural network model may be a model that has been trained to infer a class for the input data. For example, when input data is an image and a neural network model is a trained image classification model, the neural network model may infer a class of the image included in the input data and may generate and output an output value corresponding to the inferred class.

In operation 106, the computing apparatus may determine the flatness of the input data. The flatness may be used to detect whether the input data is OOD data. The flatness may correspond to a maximum loss value among loss values respectively corresponding to pieces of neighboring data within a reference distance from the input data. As a non-limiting example, the computing apparatus may obtain an output value from a neural network model receiving the pieces of neighboring data of the input data. The computing apparatus may determine an output value obtained from the neural network model receiving the input data, an output value obtained from the neural network model receiving the neighboring data of the input data, and a loss function, respectively. The maximum loss value may correspond to the flatness of the input data.

The computing apparatus may determine, for example, the maximum loss value among loss values corresponding to the neighboring data using a cross entropy loss function. However, the loss function used by the computing apparatus may vary in one or more embodiments described herein.

In operation 108, the computing apparatus may determine whether the flatness is greater than or equal to a threshold. The threshold may be a hyper parameter set by a user or a predetermined parameter. Since a parameter of the neural network model is adjusted such that the loss function approaches 0 for the data used for training the neural network model, when the input data is in-distribution data used for training the neural network model (or alike the training data), loss values corresponding to the input data and pieces of the neighboring data of the input data may be relatively small. Flatness f(x) may be defined by Equation 1 shown below.

$$f(x) = \max_{\|x'-x\|\leq\varepsilon} \ell(x', c(x); \theta) \quad \text{Equation 1}$$

Here, $\chi$ may correspond to input data. c(x) may correspond to an output value obtained from a neural network model $c_\theta$ receiving the input data $x$. θ may correspond to a parameter of the neural network model $c_\theta$. ε may correspond to a reference distance for measuring neighboring data of the input data $x$. $x'$ may correspond to neighboring data within the reference distance ε from the input data $x$. f(x) may correspond to a maximum loss value among cross entropy loss values of the neighboring data within the reference distance ε from the input data $x$ and this may correspond to the flatness of the input data $x$.

When the maximum loss value corresponding to the flatness is greater than or equal to a threshold (e.g., when "Yes" is determined in operation 108), the computing apparatus may detect that the input data is the OOD data. When the maximum loss value corresponding to the flatness is less than the threshold (e.g., when "No" is determined in operation 108), the computing apparatus may detect that the input data is in-distribution data.

When the computing apparatus detects that the input data is OOD data, the computing apparatus may determine not to output a classification result, corresponding to input data to a user or subsequent operator of the computing apparatus. For example, when the computing apparatus detects that the input data is OOD data, the computing apparatus may determine to not output the classification result of the neural network corresponding to the input data provided to the neural network, thereby improving perceived or actual the reliability/accuracy of the neural network model. When the computing apparatus detects that the input data is in-distribution data, e.g., the computing apparatus detects in-distribution input data and/or does not detect OOD input data, the computing apparatus may output a class c(x) corresponding to the input data.

Figure 2:
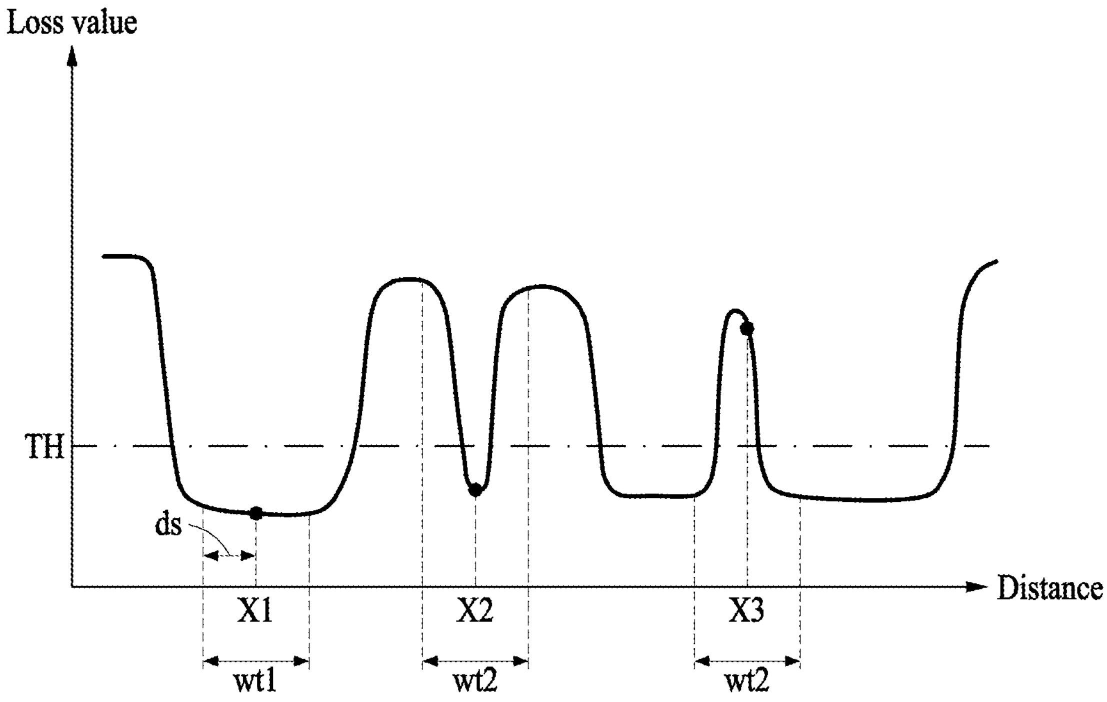
FIG. 2 illustrates an example graph demonstrating loss value corresponding to input data according to one or more embodiments.

FIG. 2 illustrates an example graph demonstrating a loss value corresponding to input data according to one embodiment.

Referring to the example graph of FIG. 2, loss values determined using a loss function for pieces of input data X1 through X3 based on an x-axis (distance) are illustrated. The x-axis (Distance) may represent, for example, an image space $\mathbb{R}$ included in input data in one dimension. The loss function may be, for example, a cross entropy loss function. However, the type of loss function used by the computing apparatus is not limited thereto and may vary depending on one or more embodiments described herein. After receiving input data, the computing apparatus may determine a loss value using a loss function for input data and pieces of neighboring data around the input data.

For example, when the computing apparatus receives first input data X1, the computing apparatus may determine loss values using a loss function for pieces of neighboring data within a reference distance ds. After determining the loss values of pieces of the neighboring data in a reference range wt1 of the first input data X1, the computing apparatus may determine a maximum loss value corresponding to the flatness of the first input data X1. The computing method may compare respective maximum loss values corresponding to each flatness of pieces of input data to a threshold TH.

The first input data X1 may be data used for training the neural network model among pieces of in-distribution data. Since the first input data X1 is used for training the neural network model, a loss value determined by using a loss function for the first input data X1 and loss values determined by using a loss function for pieces of neighboring data within the reference distance ds of the first input data X1 may be relatively small. Accordingly, the maximum value among loss values of pieces of the neighboring data around the first input data X1 may be relatively small and the flatness of the first input data X1 may be also relatively small. Since the flatness of the first input data X1 is less than the threshold TH, the computing apparatus may determine that the first input data X1 is in-distribution data. The computing apparatus may generate an output value obtained from the neural network model receiving the first input data X1.

The second input data X2 may be OOD data. Typically, because the OOD data is not used for training the neural network model, the loss value determined by using the loss function for the OOD data may be relatively great. However, occasionally, data having a relatively small loss value may exist even if the data is OOD data. The second input data X2 may include OOD data and data having a relatively small loss value. Loss values respectively corresponding to pieces of neighboring data of the second input data X2 may be relatively great.

The computing apparatus may determine a loss value for the second input data X2 using a loss function and may determine loss values of pieces of the neighboring data within a reference distance of the second input data X2 using a loss function. Even if the loss value that corresponds to the second input data X2 is not used for training the neural network model, the loss value may be relatively great. However, the loss values corresponding to pieces of the neighboring data in a range wt2 of the second input data X2 may be relatively great. A maximum value of the loss values corresponding to pieces of the neighboring data in the range wt2 of the second input data X2 may correspond to the flatness of the second input data X2 and the maximum value may be greater than the threshold TH. Accordingly, the computing apparatus may detect that the second input data X2 is OOD data. Thus, the computing apparatus may determine not to obtain an output value for the second input data X2.

The third input data X3 may include in-distribution data and data that is not used for training the neural network model. Accordingly, a loss value determined using a loss function for the third input data X3 may be relatively great. However, loss values determined using a loss function for pieces of neighboring data of the third input data X3 may be relatively small. In the detection of whether input data being OOD data, the perceived or actual reliability/accuracy of the neural network model may be improved when, e.g., only when, the neural network model is able to recognize data as in-distribution data (or not OOD data) that was not used to train the neural network model, e.g., learned by the neural network.

The computing apparatus may determine a loss value for the third input data X3 using a loss function and may determine loss values for pieces of neighboring data in a range wt3 within a reference distance of the third input data X3 using a loss function. A maximum value of the loss values corresponding to pieces of the neighboring data in the range wt3 within the reference distance of the third input data X3 may be less than the threshold TH. Accordingly, the computing apparatus may determine that the third input data X3 is OOD data. The computing apparatus may generate an output value obtained from the neural network model receiving the third input data X3.

To effectively detect data that may have a relatively great loss value because the data is not used for training (or alike such training data) the neural network model, even if the data is in-distribution data, the computing apparatus may determine the flatness based on converted input data that is obtained by transforming the input data. Hereinafter, a method of detecting whether the input data is OOD data by determining the flatness of converted data will be described with reference to FIG. 4.

Figure 3:
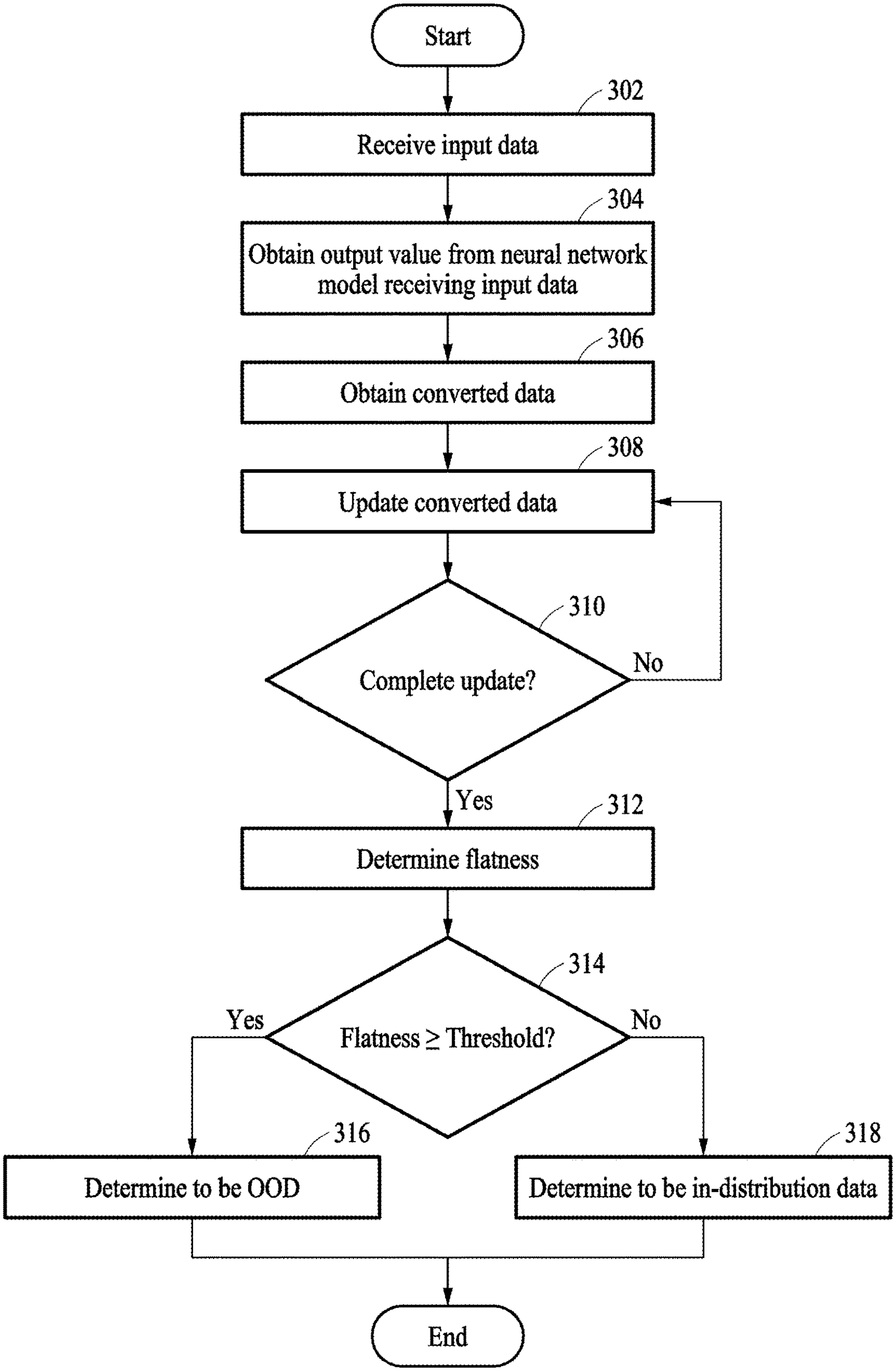
FIG. 3 illustrates an example method with OOD data detection according to one or more embodiments.

FIG. 3 illustrates an example method with OOD data detection according to one or more embodiments.

Referring to FIG. 3, the example method may include operations 302 through 318, which may be performed as illustrated by a flowchart in the shown order and manner. However, the order of some operations may be changed, or some operations may be omitted, without departing from the spirit and scope of the shown example method. Some of the operations shown in FIG. 3 may be performed in parallel, concurrently, or any suitable order that may optimize the method described with reference to FIG. 3. The example method may be performed by a computing apparatus, which may be configured to detect whether input data is OOD data based on a flatness of converted input data. The computing apparatus may include one or more processors configured to execute instructions, and one or more memories storing the instructions. The execution of the instructions by the one or more processors may configure the computing apparatus to perform any one or any combination of these or other operations and methods described herein.

In operation 302, the computing apparatus may receive input data. The input data may be an image of a target object, however the type of the input data is not limited thereto. The image may be captured by a sensor (e.g., a camera), which may be an interior or exterior of the computing apparatus.

In operation 304, the computing apparatus may generate/obtain an output value from a neural network model receiving the input data. The output value may correspond to a class inferred by the neural network model with respect to input data as the neural network model receives the input data. In an example, the output value(s) may be probability value, and may represent a probability distribution of the neural network output.

In operation 306, the computing apparatus may generate converted data by converting the input data. As a non-limiting example, the computing apparatus may add noise to the input data and may thus generate converted data that is the noise-added input data. By adding noise to the input data, the computing apparatus may help to prevent in-distribution data from being determined to be OOD data due to the determined great loss value that was large because the in-distribution data is not specifically used for training the neural network model. For example, the neural network may have been trained with many images of different animals including a class of animals of "cat". But during an inference operation may be performed for an input image of a tiger. While the training images did not include a tiger, this input should still be found to be in-distribution data even though a large loss may be calculated.

In operation 308, the computing apparatus may update the converted data generated in operation 306. The computing apparatus may generate a gradient by differentiating a maximum loss function value with respect to current converted data. The computing apparatus may thus update the converted data using gradient descent based on the generated gradient.

In operation 310, the computing apparatus may determine whether the updating of the converted data is completed. When the updating of the converted data is not completed (e.g., when "No" is determined in operation 310), the computing apparatus may return to operation 308 and may update the converted data again using gradient descent. When the update of the converted data is completed (e.g., when "Yes" is determined in operation 310), a final updated converted data is generated. In operation 312, the computing apparatus may determine a maximum loss value among loss values corresponding to neighboring data within a reference distance based on the final updated converted data. The maximum loss value may correspond to the flatness of the input data.

In operation 314, the computing apparatus may compare the flatness to the threshold. When the flatness is greater than or equal to the threshold (e.g., when "Yes" is determined in operation 314), in operation 316, the computing apparatus may detect that the input data is OOD data. When the flatness is less than the threshold (e.g., when "No" is determined in operation 314), in operation 318, the computing apparatus may detect that the input data is in-distribution data.

Figure 4:
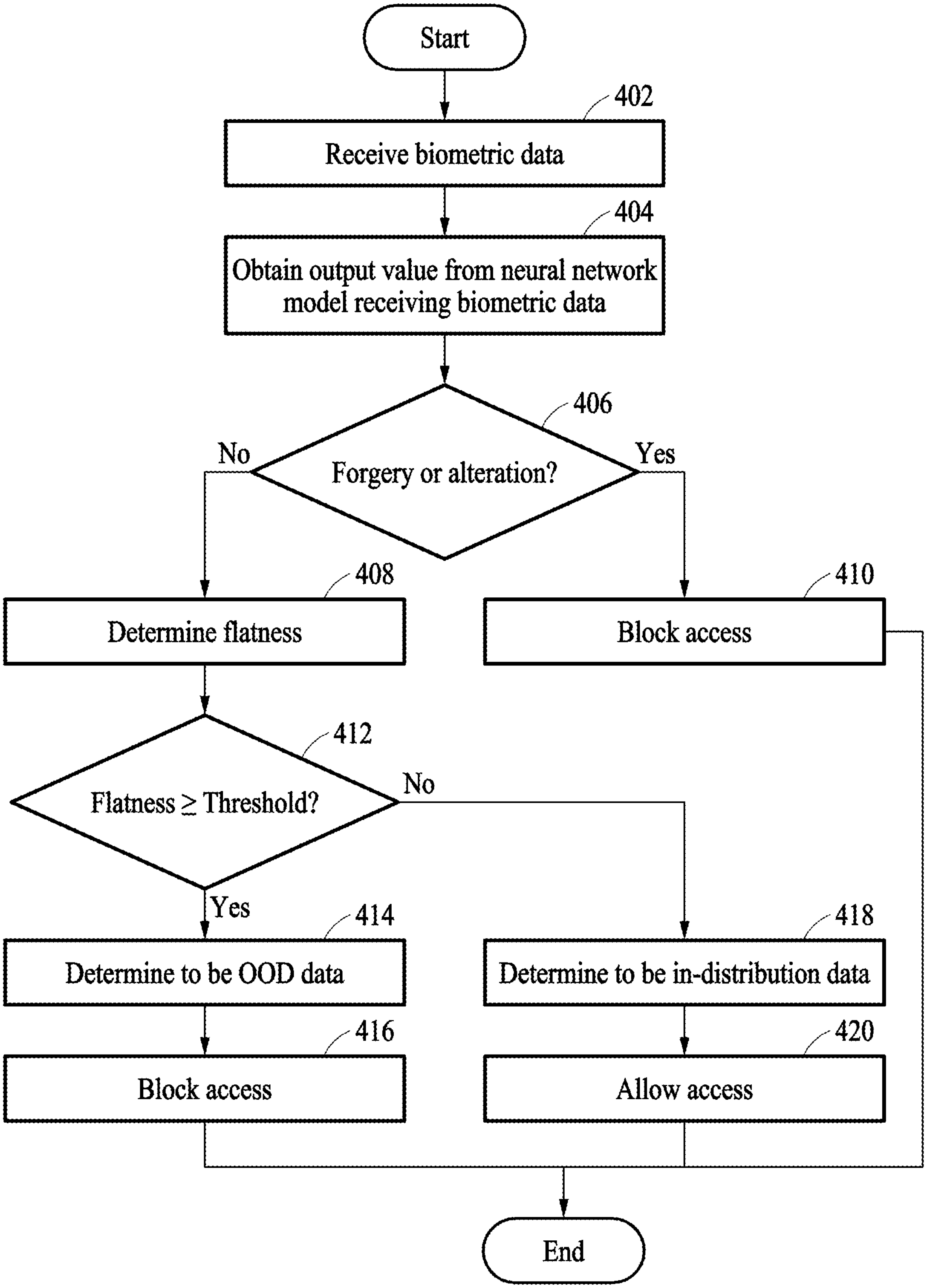
FIG. 4 illustrates an example method with OOD data detection according to one or more embodiments.

FIG. 4 illustrates an example method with biometric data inspection according to one or more embodiments.

Referring to FIG. 4, the example method may include operations 402 through 420, which may be performed as illustrated by a flowchart in the shown order and manner. However, the order of some operations may be changed, or some operations may be omitted, without departing from the spirit and scope of the shown example method. Some of the operations shown in FIG. 4 may be performed in parallel, concurrently, or any suitable order that may optimize the method described with reference to FIG. 4. This example method may be performed by a computing apparatus, which may be configured to inspect biometric data. The computing apparatus may include one or more processors configured to execute instructions, and one or more memories storing the instructions. The execution of the instructions by the one or more processors may configure the computing apparatus to perform any one or any combination of these or other operations or methods described herein.

In operation 402, the computing apparatus may receive biometric data. The biometric data may be a fingerprint, face, or iris of a target object (e.g., a person or an animal). However, the type of biometric data is not limited thereto and may vary depending on one or more embodiments described herein.

In operation 404, the computing apparatus may generate/obtain an output value from a neural network model receiving the biometric data. The neural network model may be a machine learning model that has been trained to determine forgery and alteration based on training data including biometric data.

In operation 406, the computing apparatus may detect whether the biometric data is forged or altered based on the output value generated/obtained in operation 404.

When the computing apparatus detects that the biometric data is forged or altered (e.g., when "Yes" is determined in operation 406), in operation 410, the computing apparatus may block access (e.g., of a user). For example, unlocking of a smartphone may be blocked or proceeding with a payment system using a smartphone may be blocked.

When the computing apparatus detects that the biometric data is not forged or altered (e.g., when "No" is determined in operation 406), in operation 408, the computing apparatus may determine the flatness of the biometric data. In a non-limiting example the computing apparatus may determine whether the biometric data is OOD data by firstly performing an inference process using a neural network model and secondarily determining the flatness of the biometric data.

To filter the biometric data that is accidentally or mistakenly determined as being not forged or altered even if the biometric data is OOD data, the computing apparatus may determine the flatness of the biometric data. The operation of determining the flatness of the biometric data in operation 408 may be understood by referring to the embodiment described with reference to FIGS. 1 through 3.

In operation 412, the computing apparatus may compare the flatness to a threshold to generate a comparison result. The threshold may be a preset hyperparameter and may vary depending on one or more embodiments described herein.

When the flatness is greater than or equal to the threshold (e.g., when "Yes" is determined in operation 412), in operation 414, the computing apparatus may detect that the biometric data is OOD data. When the biometric data is detected as OOD data, in operation 416, the computing apparatus may block access of a user.

When the flatness is less than the threshold (when "No" is determined in operation 412), in operation 418, the computing apparatus may detect that the biometric data is in-distribution data. When the biometric data is detected as in-distribution data, in operation 420, the computing apparatus may allow access of a user.

Figure 5:
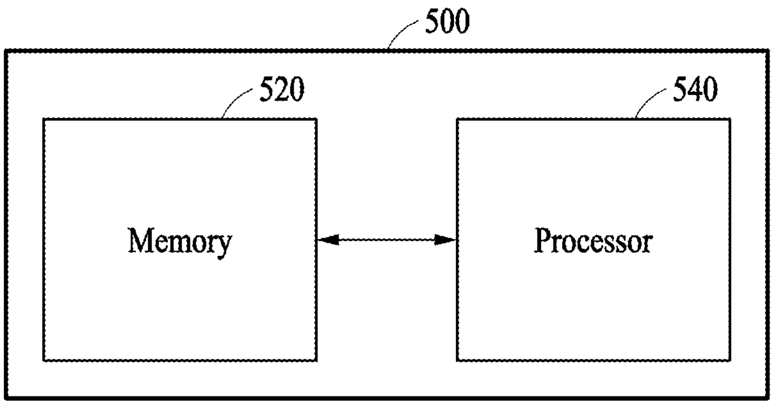
FIG. 5 illustrates an example computing apparatus with OOD data detection according to one or more embodiments.

FIG. 5 illustrates an example computing apparatus according to one or more embodiments.

Referring to FIG. 5, an example computing apparatus 500 may include a processor 520 and a memory 540. The computing apparatus 500 may be representative of any one of the computing apparatuses described above.

The processor 520 may control other components (e.g., hardware or a software component) of the computing apparatus 500 and may perform various types of data processing or operations. As at least a portion of the data processing or operations, the processor 520 may store, in the memory 540, instructions or data received from another component, may process instructions or data stored in the memory 540, and store result data in the memory 540. Operations performed by the processor 520 may be substantially the same as the operations performed by the computing apparatuses of FIGS. 1 through 4.

The memory 540 may store information necessary for the processor 520 to perform a processing operation. The memory 540 may store instructions executed by the processor 520 and may store related information while software or a program is executed in the computing apparatus 500. The memory 540 may include volatile memory such as random-access memory (RAM), dynamic RAM (DRAM), and/or non-volatile memory known in the art such as flash memory.

In a non-limiting example, the memory 540 may include instructions to perform a neural network model and instructions to determine the flatness of input data. The neural network model may output a class corresponding to an input text under control by the processor 520, and the processor 520 may determine the flatness of the input text based on the input text and the class and may detect whether the input text is OOD data based on the flatness.

The processor 520 may receive input data. The input data may be an image of a target object, however the type of the input data is not limited thereto. The image may be captured by a sensor (e.g., camera). The neural network model may be a machine learning model that have been trained as an image classification model, however the type of the neural network model is not limited thereto. The processor may generate/obtain an output value from a neural network model receiving the input data. The output value may correspond to a class inferred by the neural network model with respect to the input data.

The processor 520 may determine a maximum loss value among loss values corresponding to neighboring data based on the output value and a loss function. The maximum loss value among the loss values corresponding to the neighboring data of the input data may correspond to the flatness of the input data.

Based on the maximum loss value and the threshold, the processor 520 may detect whether the input data is OOD data that is different from training data used for training the neural network model. The processor 520 may determine, for example, the maximum loss values among the loss values corresponding to the neighboring data using a cross entropy loss function. However, the type of the loss function used to determine the loss value is not limited thereto.

The processor 520 may compare the maximum loss value corresponding to the flatness of the input data to the threshold to generate a comparison result. When the comparison result shows that the maximum loss value corresponding to the flatness of the input data is greater than or equal to the threshold, the processor 520 may detect that the input data is OOD data. When the comparison result shows that the maximum loss value corresponding to the flatness is less than the threshold, the processor 520 may detect that the input data is in-distribution data.

The processor 520 may generate converted data by converting the input data. As a non-limiting example, the processor 520 may generate the converted data by adding noise to the input data. However, the method of obtaining the converted data by the processor 520 is not limited thereto. The processor 520 may determine a maximum loss value among loss values corresponding to neighboring data within a reference distance from the converted data based on a loss function and an output value obtained from the neural network model receiving the input data. The maximum loss value may correspond to the flatness of the input data.

The processor 520 may determine a gradient value by differentiating the maximum loss value with respect to the converted data. The processor 520 may update the converted data using gradient descent based on the gradient value and the converted data and may generate updated converted data. The processor 520 may determine a maximum loss value among loss values corresponding to neighboring data within a reference distance from the updated converted data based on a loss function and an output value obtained from the neural network model receiving the input data. The maximum loss value may correspond to the flatness of the input data.

The processor 520 may keep updating the converted data by a preset number of times according to one or more embodiments. The number of updates may be a hyperparameter set by a user.

The processors, memories, computing apparatuses, electronic devices, cameras, and other apparatuses, devices, and components described herein with respect to FIGS. 1-4 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A computing apparatus comprising:

one or more processors configured to execute instructions;

and one or more memories storing the instructions, wherein, the execution of the instructions by the one or more processors configures the one or more processors to:

generate output data using a neural network model provided input data; determine, based on the output data, a maximum loss value among calculated loss values that correspond to neighboring data within a reference distance from the input data, wherein the calculated loss values are obtained by, for each of the neighboring data, obtaining an output value from the neural network model provided the respective neighboring data, and applying a loss function to the obtained output value;

detect, based on the maximum loss value and a threshold, whether the input data is out-of-distribution (OOD) data that is different from in-distribution data corresponding to training data used in a training of the neural network model;

and control user access based on the detecting, comprising blocking access when the input data is detected as the OOD data and allowing access when the input data is not detected as the OOD data.

2. The computing apparatus of claim 1, wherein, for the determining of the maximum loss, the one or more processors are further configured to determine the maximum loss value among the loss values using a cross entropy loss function.

3. The computing apparatus of claim 1, wherein, for the detection, the one or more processors are further configured to, when the maximum loss value is greater than or equal to the threshold, determine the input data to be the OOD data.

4. The computing apparatus of claim 1, wherein, for the detection, the one or more processors are further configured to, when the maximum loss value is less than the threshold, determine the input data to be the in-distribution data.

5. The computing apparatus of claim 1, wherein the input data comprises an image, the neural network model comprises an image classification model, and the in-distribution data corresponds to plural image data of each of plural classes the image classification model was trained to classify.

6. The computing apparatus of claim 1, wherein, for the determining of the maximum loss, the one or more processors are further configured to:

generate converted data by adding noise to the input data; and determine, based on the output data, the maximum loss value among loss values corresponding to neighboring data within a reference distance from the converted data.

7. The computing apparatus of claim 6, wherein, for the determining of the maximum loss, the one or more processors are further configured to:

determine a gradient value by differentiating a loss function, used to calculate the loss values, with respect to the converted data;

generate, based on the gradient value and the converted data, updated converted data using gradient descent; and determine, based on the output data and the loss function, the maximum loss value among loss values corresponding to neighboring data within a reference distance from the updated converted data.

8. A processor-implemented method, comprising:

generating output data using a neural network model provided input data;

determining, based on the output data, a maximum loss value among calculated loss values that correspond to neighboring data within a reference distance from the input data, wherein the calculated loss values are obtained by, for each of the neighboring data, obtaining an output value from the neural network model provided the respective neighboring data, and applying a loss function to the obtained output value;

detecting, based on the maximum loss value and a threshold, whether the input data is out-of-distribution (OOD) data that is different from in-distribution data corresponding to training data used in a training of the neural network model;

and control user access based on the detecting, comprising blocking access when the input data is detected as the OOD data and allowing access when the input data is not detected as the OOD data.

9. The method of claim 8, wherein the determining of the maximum loss value comprises determining the maximum loss value among the loss values using a cross entropy loss function.

10. The method of claim 8, wherein the detecting of whether the input data is the OOD data comprises, when the maximum loss value is greater than or equal to the threshold, detecting the input data to be the OOD data.

11. The method of claim 8, wherein the detecting of whether the input data is the OOD data comprises, when the maximum loss value is less than the threshold, detecting the input data to be the in-distribution data.

12. The method of claim 8, wherein the input data comprises an image, the neural network model comprises an image classification model, and the in-distribution data corresponds to plural image data of each of plural classes the image classification model has trained to classify.

13. The method of claim 8, further comprising:

generating converted data by adding noise to the input data; and determining, based on the output data, the maximum loss value among loss values corresponding to neighboring data within a reference distance from the converted data.

14. The method of claim 13, further comprising:

determining a gradient value by differentiating a loss function, used to calculate the loss values, with respect to the converted data;

generating, based on the gradient value and the converted data, updated converted data using gradient descent; and determining, based on the output data and the loss function, the maximum loss value among loss values corresponding to neighboring data within a reference distance from the updated converted data.

15. A non-transitory computer-readable storage medium storing instructions that, when executed by one or more processors, cause the one or more processors to perform the method of claim 8.

16. A computing apparatus comprising:

one or more processors configured to execute instructions; and one or more memories storing the instructions, wherein, the execution of the instructions by the one or more processors configures the one or more processors to:

generate respective output values obtained from the neural network model provided the input data and provided neighboring data within a reference distance from the input data;

generate, based on the generated respective output values and a loss function, a flatness value corresponding to a maximum loss value among loss values obtained by applying the loss function to the generated respective output values of the neighboring data;

detect, based on the flatness and a threshold, whether the input data is out-of-distribution (OOD) data;

and control user access based on the detecting, comprising blocking access when the input data is detected as the OOD data and allowing access when the input data is not detected as the OOD data.

17. The computing apparatus of claim 16, wherein the neighboring data is generated by adding noise to the input data.

18. The computing apparatus of claim 16, wherein the one or more processors are further configured to determine the input data is forged or altered biometric data based on the input data being detected to be the OOD data.

19. The computing apparatus of claim 18, wherein the one or more processors are further configured to determine, based on the flatness value, whether the input data is forged or altered biometric data.

20. The computing apparatus of claim 16, wherein the flatness value corresponds to a maximum loss value among loss values generated using the loss function and the respective output values.

* * * * *